US012753267B2

(12) United States Patent
Dawn et al.

(10) Patent No.: US 12,753,267 B2
(45) Date of Patent: Oct. 6, 2026

(54) COVER COATING WITH GOOD ADHESION ON POLYURETHANE AND POLYUREA MEMBRANES

(71) Applicant: SIKA TECHNOLOGY AG, Baar (CH)

(72) Inventors: Steven Dawn, Ormskirk (GB); Michael Byrne, Lytham (GB); Alexander Coward, Sale (GB)

(73) Assignee: SIKA TECHNOLOGY AG, Baar (CH)

(*) Notice: Subject to any disclaimer, the term of this patent is extended or adjusted under 35 U.S.C. 154(b) by 506 days.

(21) Appl. No.: 18/289,651

(22) PCT Filed: May 24, 2022

(86) PCT No.: PCT/EP2022/064043
§ 371 (c)(1),
(2) Date: Nov. 6, 2023

(87) PCT Pub. No.: WO2022/253635
PCT Pub. Date: Dec. 8, 2022

(65) Prior Publication Data

US 2024/0287241 A1 Aug. 29, 2024

(30) Foreign Application Priority Data

Jun. 4, 2021 (EP) .................................... 21177821

(51) Int. Cl.

| | |
|---|---|
| ***C08G 18/32*** | (2006.01) |
| ***C08G 18/10*** | (2006.01) |
| ***C08G 18/38*** | (2006.01) |
| ***C08G 18/42*** | (2006.01) |
| ***C08G 18/50*** | (2006.01) |
| ***C08G 18/66*** | (2006.01) |
| ***C08G 18/72*** | (2006.01) |
| ***C08G 18/73*** | (2006.01) |
| ***C08G 18/79*** | (2006.01) |
| ***C08K 3/22*** | (2006.01) |
| ***C09D 5/00*** | (2006.01) |
| ***C09D 175/06*** | (2006.01) |
| ***C09D 175/12*** | (2006.01) |

(52) U.S. Cl.
CPC ......... *C08G 18/3234* (2013.01); *C08G 18/10* (2013.01); *C08G 18/3228* (2013.01); *C08G 18/3821* (2013.01); *C08G 18/4236* (2013.01); *C08G 18/5021* (2013.01); *C08G 18/6685* (2013.01); *C08G 18/721* (2013.01); *C08G 18/73* (2013.01); *C08G 18/792* (2013.01); *C09D 5/00* (2013.01); *C09D 175/06* (2013.01); *C09D 175/12* (2013.01); *C08K 2003/2241* (2013.01)

(58) Field of Classification Search
CPC ........................... C08G 18/3234; C08G 18/10; C08G 18/3228; C08G 18/73; C08G 18/4236; C08G 18/5021; C08G 18/6685; C08G 18/721; C08G 18/792; C08G 18/3821; C08K 2003/2241; C09D 175/12; C09D 5/00; C09D 175/06
See application file for complete search history.

(56) References Cited

U.S. PATENT DOCUMENTS

2018/0362801 A1 12/2018 Wade et al.
2021/0130647 A1 5/2021 Weinhold et al.

FOREIGN PATENT DOCUMENTS

EP 3 666 811 A1 6/2020
WO 2016/210237 A1 12/2016

OTHER PUBLICATIONS

Aug. 18, 2022 International Search Report issued in International Patent Application No. PCT/EP2022/064043.
Nov. 21, 2023 International Preliminary Report on Patentability issued in International Patent Application No. PCT/EP2022/064043.

*Primary Examiner* — Patrick D Niland
(74) *Attorney, Agent, or Firm* — Oliff PLC

(57) ABSTRACT

A composition includes a first component containing at least one polyaspartic acid ester (P1-1) and optionally a polyaspartic acid ester (P1-2) and a mixture of various polyetheraspartic acid esters (P2), and of a second component containing at least one aliphatic polyisocyanate (B1) and at least one isocyanate prepolymer (B2). The composition is particularly suitable as a cover coating composition. Said composition has a good adhesion on polyurea and polyurethane membranes, in particular roof membranes, and has drying times of less than 120 min, an elongation at break of 80-200% and a tensile strength of more than 6 N/mm$^2$.

16 Claims, No Drawings

COVER COATING WITH GOOD ADHESION ON POLYURETHANE AND POLYUREA MEMBRANES

TECHNICAL FIELD

The invention relates to a multicomponent composition, especially a two-component composition, which is suitable as top coating above polyurethane or polyurea membranes, especially for roofing applications.

PRIOR ART

Especially in the field of roofing, membranes such as polyurethane or polyurea membranes are used, which are based on two-component coating compositions that contain aromatic material and are typically applied to the base structure in liquid form.

These membranes are not normally stable to weathering and UV and therefore require an additional top coating. Such top coatings typically contain a considerable proportion of volatile organic solvents in order to ensure good adhesion to the membranes mentioned. However, this is disadvantageous for reasons of protection of the environment and health, since the compositions have high VOC emissions as a result.

WO 2016/210237 A1 discloses a method of coating substrates, comprising a pretreatment of the substrate with a pretreatment composition and the applying of a coating composition comprising an aliphatic polyisocyanate and an isocyanate-reactive compound based on a polyaspartic acid.

US 2018/362801 A1 describes a coating composition comprising a mixture of aspartic ester-functional amines, an acrylate-containing compound and one or more polyisocyanates.

US 2021/130647 A1 discloses erosion-stable coating compositions that especially serve as edge protection for rotor blades. The composition comprises a polyol component and a hardener component, where the polyol component comprises at least one trifunctional polycaprolactone polyol or at least one polycarbonate diol or at least one trifunctional polycaprolactone polyol and a polycarbonate diol, and the hardener component contains at least one isocyanate-functional prepolymer.

EP 3 666 811 A1 describes a coating composition suitable for floors and metal articles, with an isocyanate-reactive component comprising a polyaspartic ester and an isocyanate component comprising an isocyanate prepolymer and an isocyanate oligomer.

There is therefore a need for two-component reactive coatings that are suitable as top coating and have good adhesion to polyurethane or polyurea membranes, even in the absence of volatile organic solvents. Such coatings preferably have a drying time of less than 120 min, preferably less than 75 min, and an elongation at break of 80-200% and a tensile strength of more than 6 $N/mm^2$.

SUMMARY OF THE INVENTION

It is an object of the invention to provide a top coating composition having sufficient adhesion to the substrates/membranes mentioned, especially roof membranes, and preferably having a drying time of less than 120 min, preferably less than 75 min, and an elongation at break of 80-200% and a tensile strength of more than 6 $N/mm^2$.

It has been found that, surprisingly, this object is achieved by a composition as claimed in claim 1.

Further aspects of the invention are the subject of further independent claims. Particularly preferred embodiments of the invention are the subject of the dependent claims.

Ways of Executing the Invention

The invention provides a composition consisting of a first component comprising:

at least one polyaspartic ester P1-1

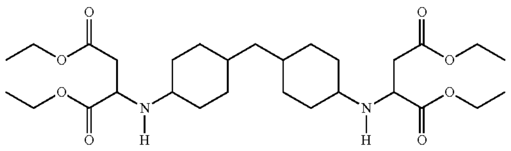 [SMILES: CCOC(=O)CC(NC1CCC(CC2CCC(NC(CC(=O)OCC)C(=O)OCC)CC2)CC1)C(=O)OCC]

of the formula (II);

optionally a polyaspartic ester P1-2

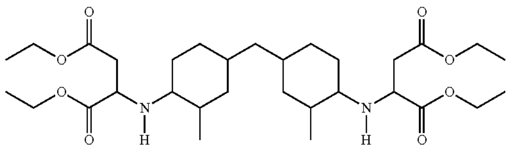 [SMILES: CCOC(=O)CC(NC1CCC(CC2CCC(NC(CC(=O)OCC)C(=O)OCC)C(C)C2)CC1C)C(=O)OCC]

of the formula (III);

a mixture of different polyether aspartic esters P2 having the following formula:

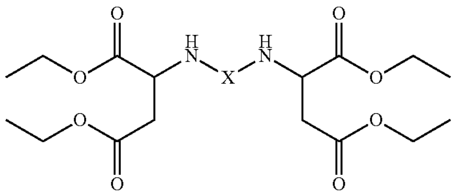

where X is the residue of a polyether polyamine having a repeat unit of the structure

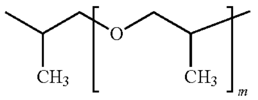

where m=2 to 35, in particular m=2 to 6, in particular m=2 to 4, and a second component comprising:

at least one aliphatic polyisocyanate B1;

at least one isocyanate prepolymer B2.

The polyaspartic ester P1-1, the optional polyaspartic ester P1-2 and the mixture of different polyether aspartic esters P2 are present in such an amount that the weight ratio ((P1-1+P1-2)/P2) is ≤1.5.

The weight ratio of polyaspartic ester P1-1 to the optional polyaspartic ester P1-2, (P1-1/P1-2), is ≥0.65.

Moreover, the weight ratio of aliphatic polyisocyanate B1 to isocyanate prepolymer B2, (B1/B2), is in the range of 0.7-3.0.

A "primary hydroxyl group" refers to an OH group bonded to a carbon atom having two hydrogens.

A "primary amino group" refers to an $NH_2$ group bonded to one organic radical, and a "secondary amino group" refers to an NH group bonded to two organic radicals which may also together be part of a ring.

In the present document, "molecular weight" is understood to mean the molar mass (in grams per mole) of a molecule. "Average molecular weight" is understood to mean the number average Mn of an oligomeric or polymeric mixture of molecules, which is typically determined by means of gel permeation chromatography (GPC) against polystyrene as standard.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

"Room temperature" refers to a temperature of 23° C.

A composition referred to as a "two-component" composition is one in which the constituents of the composition are present in two different components that are stored in separate containers and are not mixed with one another until shortly before or during the application of the composition.

The composition includes, in the first component, at least one polyaspartic ester P1-1

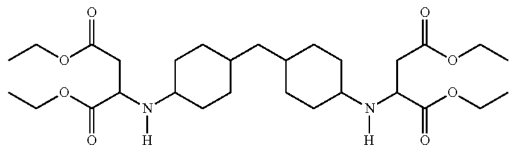 [SMILES: CCOC(=O)CC(NC1CCC(CC2CCC(NC(CC(=O)OCC)C(=O)OCC)CC2)CC1)C(=O)OCC]

of the formula (II).

A suitable polyaspartic ester P1-1 is commercially available from Bayer Materials Science under the Desmophen NH1423 trade names.

The composition optionally includes, in the first component, at least one polyaspartic ester P1-2

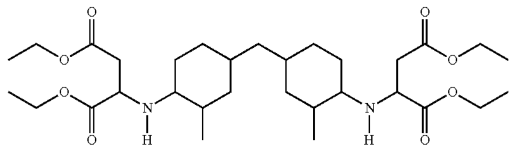 [SMILES: CCOC(=O)CC(NC1CCC(CC2CCC(NC(CC(=O)OCC)C(=O)OCC)C(C)C2)CC1C)C(=O)OCC]

of the formula (III).

A suitable polyaspartic ester P1-2 is commercially available from Bayer Materials Science under the Desmophen NH1520 trade names.

The polyaspartic ester P1-1 and the optional polyaspartic ester P1-2 preferably have an equivalent weight of 220-300, in particular 250-300, more preferably 270-295.

It is further preferable when the polyaspartic ester P1-1 and the optional polyaspartic ester P1-2 have a viscosity at 25° C. of 500-3000 mPas, 600-2500 mPas, in particular 700-2200 mPas, according to DIN 53 019, especially measured with a Physica MCR 301 plate-plate rheometer with a measurement gap of 0.5 mm according to DIN 53 019-1.

The polyaspartic ester P1-1 and the optional polyaspartic ester P1-2 preferably have an amine value of 160-300, in particular 170-300, more preferably 180-205.

The weight ratio of polyaspartic ester P1-1 to the optional polyaspartic ester P1-2, (P1-1/P1-2), is ≥0.65.

It has been found that, surprisingly, a weight ratio (P1-1/P1-2) of less than 0.65 leads to inadequate tensile strength and too long a drying time. This is apparent, for example, in examples Ref. 10-Ref. 13. The weight ratio P1-1/P1-2 is preferably in the range of ≥0.75, in particular ≥0.8.

It may further be advantageous when the weight ratio (P1-1/P1-2) is ≥5, in particular ≥10, in particular ≥50. It may also be advantageous when the sum total of polyaspartic esters P1-1 and the mixture of different polyether aspartic esters P2 together, (P1-1+P2), accounts for more than 80% by weight, preferably more than 90% by weight, in particular more than 95% by weight, especially preferably more than 90% by weight, most preferably more than 99% by weight, of the polyether aspartic esters present in the first component, based on the total weight of the first component.

The polyaspartic ester P1-1, the optional polyaspartic ester P1-2 and the mixture of different polyether aspartic esters P2 are present in such an amount that the weight ratio ((P1-1+P1-2)/P2) is ≤1.5.

It has been found that, surprisingly, a weight ratio ((P1-1+P1-2)/P2)>1.5 leads to inadequate elongation at break. This is apparent, for example, in examples Ref.3-Ref.4 and Ref.8-Ref.9. The weight ratio is preferably ≤1.4, in particular ≤1.35, in particular 0.25-1.35, in particular 0.5-1.1, more preferably 0.6-1.0, most preferably 0.7-0.9.

The composition includes, in the first component, a mixture of different polyether aspartic esters P2 having the formula

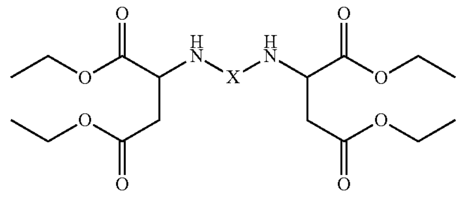

where X is the residue of a polyether polyamine having a repeat unit of the structure

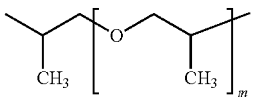

where m=2 to 35, in particular m=2 to 6, in particular m=2 to 4.

The mixture of polyether aspartic esters comprises at least two different polyether aspartic esters having a different number of repeat units in X. In preferred embodiments, the mixture is such that m is in the range from 2 to 4. Such polyether aspartic esters can be prepared by reacting a mixture of polyether polyamines with a dialkyl maleate. Such polyether aspartic esters can be prepared, for example, by using the reactants in such amounts that there is at least one equivalent, preferably one equivalent, of olefinic double bonds for each equivalent of primary amino groups.

Suitable polyether polyamines that can be reacted with dialkyl maleates in Michael addition reactions are, for example, the JEFFAMINE polyetheramines that are commercially available from Huntsman Corporation, The Woodlands, TX. In particularly preferred embodiments, the mixture of polyether polyamines comprises a mixture of polyether polyamines of the formula (IV)

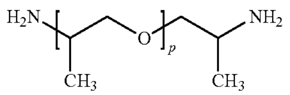

where p is a number having a value of at least 2, especially 2 to 35, 2 to 8, preferably 2.5 to 6.1.

The mixture of different polyether aspartic esters P2 preferably comprises: (1) at least 50% to 99% by weight, such as 50% to 90% by weight, or in some cases 80% to 90% by weight of a polyether polyamine of the formula (IV) in which p has a value of 2.5; and (2) 1% to 50% by weight, especially 10% to 50% by weight, preferably 10% to 20% by weight, of a polyether polyamine of the formula (IV) in which p has a value of 6.1.

A preferred example of a suitable mixture of polyether aspartic esters P2 is DESMOPHEN NH 2850 XP from Bayer Materials Science, which has an equivalent weight of 295, a viscosity at 25° C. of about 100 mPas, and an amine value of about 190 mg KOH/g.

It may further be advantageous when the at least one polyaspartic ester P1-1, the optional at least one polyaspartic ester P1-2 and the mixture of different polyether aspartic esters P2 collectively contain more than 80% by weight, preferably more than 90% by weight, in particular more than 95% by weight, especially preferably more than 98% by weight, most preferably more than 99% by weight, of the NCO-reactive groups, especially the amino groups, of the first component, based on the total weight of the first component.

The second component of the composition comprises an aliphatic polyisocyanate B1.

An "aliphatic isocyanate" refers to an isocyanate wherein the isocyanate groups are bonded directly to an aliphatic carbon atom. Accordingly, isocyanate groups of this kind are referred to as "aliphatic isocyanate groups".

Suitable aliphatic polyisocyanates B1 are in particular monomeric di- or triisocyanates and also oligomers, polymers, and derivatives of monomeric di- or triisocyanates, and any desired mixtures thereof.

Preferred aliphatic monomeric polyisocyanates B1 are aliphatic or cycloaliphatic diisocyanates, especially HDI, TMDI, cyclohexane 1,3-diisocyanate or 1,4-diisocyanate, IPDI, H12MDI, 1,3- or 1,4-bis(isocyanatomethyl)cyclohexane.

A particularly preferred monomeric polyisocyanate B1 is HDI, IPDI or H12MDI. Most preferred is HDI or IPDI, especially HDI.

Suitable oligomers, polymers, and derivatives of the monomeric di- and triisocyanates mentioned are especially those derived from HDI or IPDI, especially HDI. Among these, commercially available products are especially suitable, for example Desmodur® N 75, Desmodur® N 3600, and Desmodur® N 3900 (all from Bayer).

They preferably have an NCO content of 16% to 25% by weight, preferably 20% to 25% by weight.

They preferably have a viscosity at 23° C. of 500-2000 m·Pas, preferably 700-1500 m·Pas, especially 1000-1500 m·Pas, to DIN EN ISO 3219/A.3.

Particularly preferred aliphatic polyisocyanates B1 are oligomers, polymers, and derivatives derived from HDI or IPDI, especially HDI. They preferably have an NCO content of 16% to 25% by weight, especially 20% to 25% by weight.

The second component of the composition additionally contains at least one isocyanate prepolymer B2, preferably having an isocyanate group equivalent of 300 to 1100. An isocyanate group equivalent of less than 300 is disadvantageous in that low values of tensile strength and elongation at break are obtained as a result.

The isocyanate prepolymer B2 has an isocyanate group (NCO) functionality of preferably 1.9 to 4.5, preferably 1.9 to 3.5, more preferably 1.9 to 2.5. An isocyanate group equivalent of more than 4.5, or 3.5, or 2.5, is disadvantageous in that lower values of tensile strength and elongation at break are obtained as a result.

The isocyanate prepolymer B2 preferably has an isocyanate group (NCO) content of 1% to 40% by weight, more preferably 5% to 20% by weight and most preferably 5% to 15% by weight, based on the total weight of the isocyanate prepolymer B2.

The isocyanate prepolymer B2 preferably has a viscosity of 1000 to 10 000 m·Pas, more preferably 1000 to 5000 m·Pas, most preferably 1000 to 2500 mPa·s.

The isocyanate prepolymer B2 is preferably the reaction product of an aliphatic isocyanate monomer and/or an aliphatic isocyanate oligomer with a polyol. Compared to a reaction product with a monoalcohol, one reason why this is advantageous is that higher values for tensile strength and elongation at break are obtained as a result. Reaction products with a monoalcohol are typically used as crosslinkers, for example allophanate group-containing reaction products of HDI and/or HDI isocyanurates with monoalcohols.

Such monoalcohols are typically linear, branched or cyclic monoalcohols containing 1 to 12 carbon atoms. One example of such a reaction product with a monoalcohol is Desmodur® XP 2763 from Covestro Co., Ltd.

The reaction for preparation of the isocyanate prepolymer B2 has an NCO/OH molar ratio of preferably 1.1:1 to 40:1 and most preferably 2:1 to 25:1. The excess isocyanate monomers that remain in the reaction for preparation of the isocyanate prepolymer can be removed by distillation in order to obtain a prepolymer without monomer.

The aliphatic isocyanate is preferably selected from the list consisting of hexamethylene diisocyanate (HDI), 2,2-dimethylpentane diisocyanate, 2,2,4-trimethylhexane diisocyanate, butene diisocyanate, 1,3-butadiene 1,4-diisocyanate, 2 4,4-trimethylhexane 1,6-diisocyanate, bis(isocyanatoethyl) carbonate, bis(isocyanatoethyl) ether and lysine methyl ester diisocyanate, most preferably hexamethylene diisocyanate.

The polyol is preferably one or more selected from the list consisting of polyether polyol, polyester polyol and polycarbonate polyol, more preferably a polyether polyol and/or a polyester polyol.

One reason why this is advantageous is that higher values for tensile strength and elongation at break are obtained as a result. The polyol has an average molecular weight of preferably more than 300 g/mol, more preferably more than 500 g/mol and most preferably 500 to 8000 g/mol. The polyol contains preferably 2 to 6 functional hydroxyl groups and most preferably 2 to 3 functional hydroxyl groups.

The isocyanate prepolymer B2 preferably comprises one or more of the following groups: a carbamate group and an allophanate group.

The weight ratio of aliphatic polyisocyanate B1 to isocyanate prepolymer B2, (B1/B2), is in the range of 0.7-3.0.

A weight ratio B1/B2 of less than 0.7 is disadvantageous in that this gives values for elongation at break that are too low, coupled with simultaneously high values for tensile strength values. This leads to a brittle product that does not have the requisite flexibility.

A weight ratio B1/B2 of greater than 3 results in excessively high elongation at break values and a reduction in tensile strength.

The weight ratio B1/B2 is preferably 0.8-2.5, in particular 0.9-2.0, more preferably 0.95-1.75, most preferably 1.25-1.75.

It is further advantageous when the sum total of the NCO groups that do not originate from B1 and B2 is ≤20%, especially ≤10%, especially preferably ≤5%, most preferably ≤1%, based on the sum total of all NCO groups of the two-component polyurea composition.

The proportion of the aliphatic polyisocyanates B1 and B2 is preferably ≥90% by weight, especially ≥95% by weight, especially preferably ≥99% by weight, based on the total weight of the second component.

The composition preferably additionally comprises fillers. Suitable fillers are especially ground or precipitated calcium carbonates, optionally coated with fatty acids, especially stearates, barytes, quartz flours, quartz sands, dolomites, wollastonites, kaolins, calcined kaolins, sheet silicates, such as mica or talc, zeolites, aluminum hydroxides, magnesium hydroxides, silicas, including finely divided silicas from pyrolysis processes, cements, gypsums, fly ashes, industrially produced carbon blacks, graphite, metal powders, for example of aluminum, copper, iron, silver or steel, PVC powders or hollow beads.

The proportion of fillers is preferably 5-35% by weight, 10-30% by weight, in particular 15-25% by weight, based on the total weight of the composition.

The composition preferably includes less than 5% by weight, less than 2% by weight, less than 1% by weight, less than 0.5% by weight, in particular less than 0.1% by weight, of organic solvents, based on the total weight of the composition. More preferably, the composition is free of organic solvents. Such organic solvents are especially selected from the list consisting of acetone, methyl ethyl ketone, methyl n-propyl ketone, diisobutyl ketone, methyl isobutyl ketone, methyl n-amyl ketone, methyl isoamyl ketone, acetylacetone, mesityl oxide, cyclohexanone, methylcyclohexanone, ethyl acetate, propyl acetate, butyl acetate, n-butyl propionate, diethyl malonate, 1-methoxy-2-propyl acetate, ethyl 3-ethoxypropionate, diisopropyl ether, diethyl ether, dibutyl ether, diethylene glycol diethyl ether, ethylene glycol diethyl ether, ethylene glycol monopropyl ether, ethylene glycol mono(2-ethylhexyl) ether, acetals such as, in particular, methylal, ethylal, propylal, butylal, 2-ethylhexylal, dioxolane, glycerol formal or 2,5,7,10-tetraoxaundecane (TOU), and toluene, xylene, heptane, octane, naphtha, white spirit, petroleum ether or petroleum spirit, especially Solvesso™ products (from Exxon), methylene chloride, propylene carbonate, butyrolactone, N-methylpyrrolidone and N-ethylpyrrolidone.

This is advantageous for reasons of protection of the environment and health, since the compositions have low VOC emissions as a result. It has been found that, surprisingly, the present invention achieves a low viscosity without the solvents described above.

The composition may comprise further additives commonly used for polyurea compositions. More particularly, the following auxiliaries and additives may be present:

- inorganic or organic pigments, especially titanium dioxide, chromium oxides or iron oxides;
- rheology modifiers;
- additives, especially wetting agents, leveling agents, defoamers, deaerators, stabilizers against oxidation, heat, light or UV radiation, or biocides;

or further substances customarily used in such compositions.

The ratio of isocyanate groups relative to the groups reactive with isocyanate groups, especially amino groups, is preferably in the range from 0.95 to 1.5, more preferably in the range from 1.0 to 1.4, more preferably in the range from 1.05 to 1.3, more preferably in the range from 1.05 to 1.2, especially preferably in the range from 1.1 to 1.15.

The composition immediately after the two components have been mixed, especially for 30 seconds at 2000 rpm, preferably has a viscosity of 4,000 to 10,000 mPas, in particular 6,000 to 9,000 mPas, more preferably 8,000 to 9,000 mPas, measured for 30 seconds at 5 rpm with a No. 5 spindle, determined with a Brookfield viscometer at 23° C.

The first and second components of the composition are mutually separate components. The first and second components of the composition are produced separately from one another. The constituents of the respective component are mixed here with one another preferably with exclusion of moisture, so as to give a macroscopically homogeneous liquid. Each component is preferably stored in a separate moisture-tight container. A suitable container is in particular a drum, a bulk container, a hobbock, a pail, a can, a pouch, a canister or a bottle.

For the use of the composition, the two components are mixed with one another shortly before or during the application. The mixing ratio is preferably chosen such that the groups reactive toward isocyanates are present in a suitable ratio to the isocyanate groups, as described above. In parts by weight, the mixing ratio between the first and second components is typically in the range from about 1:1 to 20:1, especially 2:1 to 10:1.

The two components are mixed by means of a suitable stirring mechanism, such as a double-shaft mixer, for example, with the individual components suitably having been premixed in the correct mixing ratio. Likewise possible is continuous machine processing by means of a two-component metering unit with static or dynamic mixing of the components. In the mixing, it should be ensured that the two components are mixed with maximum homogeneity. If mixing precedes application, care must be taken to ensure that the time elapsing between mixing of the components and the application of the mixture is not too great, since if it is there may be disruptions, such as poor flow or retarded or incomplete development of the adhesion to the substrate, for example. Mixing takes place in particular at ambient temperature, which is typically in the range from about 5 to 50° C., preferably at about 10 to 35° C. Curing by chemical reaction begins with the mixing of the two components. NCO-reactive groups available, especially amino groups, react here with isocyanate groups available. As a result of these reactions, the composition cures to give a solid material. This process is also referred to as crosslinking.

The invention further relates to a cured composition obtained from a composition as described above, after the two components have been mixed and cured.

In the application, the freshly mixed, still-liquid composition is applied as a coating to a surface. Preference is given to applying the composition by pouring it onto a substrate and then distributing it over the area until the layer thickness is as desired, for example by means of a roller, a brush or a paintbrush. However, it can also be applied by a spray application, preferably with a spray pressure of more than 50 bar, especially more than 100 bar.

In a further aspect, the present invention relates to a method of applying the aforementioned mixed composition as top coating to a substrate. The substrates are preferably those listed above as preferred.

Preference is given to a coating (after drying) having a total layer thickness in the range from 100 to 400 μm, in particular 150 to 300 μm, in particular 200 to 250 μm.

Suitable substrates that can be coated with the composition are especially polyurethane or polyurea compositions, especially polyurethane or polyurea membranes.

The aforementioned substrates are preferably substrates exposed to the atmosphere. The expression "exposed to the atmosphere" is preferably understood to mean objects that are exposed to air pollution and weathering.

The aforementioned substrates are preferably substrates for roofing applications.

A further aspect of the invention therefore concerns the use of the composition of the invention as coating, especially as top coating, especially for protection of the aforementioned substrates and objects against weathering.

Preference is given to use in a coating system comprising at least one layer of the above-described composition.

It is further advantageous when the composition has a total layer thickness after drying in the range from 100 to 400 μm, in particular 150 to 300 μm, in particular 200 to 250 μm.

The aforementioned method or the application and curing of the composition affords an article. In a further aspect, the present invention relates to such an article. It is preferably an aforementioned object for roofing applications.

The composition of the invention preferably has the following properties:

- Viscosity, measured for 30 seconds at 5 rpm with a No. 5 spindle, determined with a Brookfield viscometer at 23° C., immediately after mixing of the two components: 4,000 to 10,000 mPas, in particular 6,000 to 9,000 mPas, preferably 8,000 to 9,000 mPas;
- Set to touch time, determined with a Beck-Koller drying time recorder to BE EN ISO 9117-4 (2012): less than 120 min, preferably less than 75 min;
- Through dry time, determined with a Beck-Koller drying time recorder to BE EN ISO 9117-4 (2012): less than 240 min, preferably less than 180 min;
- Tensile strength to BS EN ISO 527-3: more than 6 $N/mm^2$, preferably more than 8 $N/mm^2$, more than 10 $N/mm^2$, more than 15 $N/mm^2$, in particular more than 18 $N/mm^2$;
- Elongation at break to BS EN ISO 527-3: 80-200%, preferably 100-200%;
- Bond strength (as described in the examples): more than 30 N, preferably more than 50 N, in particular more than 80 N.

EXAMPLES

Working examples are adduced hereinafter, which are intended to further elucidate the invention described. The invention is of course not limited to these described working examples.

1. Commercial Substances Used:

| | |
|---|---|
| P1-1 | P1-1, Desmophen NH1423: amino-functional polyaspartic ester, amine value 202-208 mg KOH/g, equivalent weight 274, viscosity at 25° C. 850-2.200 mPas to DIN 53 019 (from Bayer Materials Science) |
| P1-2 | P1-2, Desmophen NH1520: amino-functional polyaspartic ester, amine value 189-193 mg KOH/g, equivalent weight 290, viscosity at 25° C. 800-2.000 mPas to DIN 53 019 (from Bayer Materials Science) |

-continued

| | |
|---|---|
| P2 | Desmophen NH 2850 XP, mixture of amino-functional polyaspartic esters, amine value 190 mg KOH/g, equivalent weight 295, viscosity at 25° C. 100 mPas to DIN 53 019 (from Bayer Materials Science) |
| Defoamer | Afcona 2290 |
| Dispersant | Tego Dispers 652 |
| HALS | Tinuvin 292 |
| Antioxidant | Univul 3035 |
| Molecular sieve | Molecular sieve |
| $TiO_2$ | Kronos 2310 |
| Baryte | Baryte |
| Silica | Fumed silica |
| B1 | Tolonate HDT-LV, trimer of hexamethylene diisocyanate (HDI); NCO content 22.0-24.0% by weight (from Vencorex) |
| B2 | Desmodur E 2863 XP: reaction product of an aliphatic polyester polyol and HDI with an NCO equivalent of 380, an NCO content of 11.1% by weight, an NCO functionality of about 2.0, an HDI monomer content of less than 0.3% by weight and a viscosity of about 1350 mPa · s (23° C.), available from Covestro Co., Ltd. |

2. Production of the Compositions

For each composition, the ingredients specified in tables 1 to 3 were processed in the specified amounts (in parts by weight) of the first component ("component 1") to give a homogeneous liquid, and stored. Subsequently, the amount of the second component specified in tables 1 to 3 was added to the first component in an NCO/NH ratio of 1.1, and the two components were mixed in a Speedmixer at 2000 rpm for 30 seconds. The latter was tested immediately as follows:

Viscosity was measured for 30 seconds at 5 rpm with a No. 5 spindle, determined with a Brookfield viscometer at 23° C.

The viscosity of all the compositions tested was in the range of 8,400-8,800 mPas.

The curing rate ("BK drying time") was determined with a Beck-Koller drying time recorder to BE EN ISO 9117-4 (2012).

The result for phase 1 corresponds to the set to touch time of the composition.

The result for phase 4 corresponds to the through dry time of the composition.

Mechanical properties are measured with a Lloyd tensometer machine to BS EN ISO 527-3. The samples (triple determination) are produced from cured films (curing for 24 h at 23° C., followed by 24 h in an air circulation oven at 60° C.) with dimensions of 25 mm×100 mm×0.2 mm, and the tensometer is used to calculate tensile strength and elongation at break. The measurements were conducted at 23° C. and 50% relative air humidity.

For determination of the mechanical properties after water storage, the specimens were additionally stored at 60° C. in a water bath for 2 weeks, and then the mechanical properties were determined as described above.

For determination of the mechanical properties after heat storage, the specimens were additionally stored at 80° C. in an air circulation oven for 2 weeks, and then the mechanical properties were determined as described above.

Bond strength was determined to ISO 8510-1:1990.

The substrate used was a membrane made from a 2-component polyurea composition (Sikalastic-702, available from Sika UK). 24 hours after application of the polyurea composition, the compositions were applied thereto and stored at 23° C. and 50% relative humidity for one week before bond strength was determined.

Compositions E1 to E12 are inventive examples. Compositions Ref.1 to Ref.13 are comparative examples.

TABLE 1

| | Ref. 1 | Ref. 2 | E1 | E2 | Ref. 3 | Ref. 4 | Ref. 5 | Ref. 6 | Ref. 7 |
|---|---|---|---|---|---|---|---|---|---|
| Component 1 | | | | | | | | | |
| P1-1 | 5.08 | 10.08 | 15.08 | 20.08 | 30.08 | 35.08 | 10.08 | 15.08 | 20.08 |
| P2 | 21.08 | 21.08 | 21.08 | 21.08 | 11.08 | 6.08 | 16.08 | 11.08 | 6.08 |
| P1-2 | 22.32 | 17.23 | 12.32 | 7.32 | 7.32 | 7.32 | 22.32 | 22.32 | 22.32 |
| P1/P2 | 1.30 | 1.30 | 1.30 | 1.30 | 3.38 | 6.97 | 2.01 | 3.38 | 6.97 |
| P1-1/P1-2 | 0.23 | 0.59 | 1.22 | 2.74 | 4.11 | 4.79 | 0.45 | 0.68 | 0.90 |
| Component 2 | | | | | | | | | |
| B2 | 52.38 | 52.38 | 52.38 | 52.38 | 52.38 | 52.38 | 52.38 | 52.38 | 52.38 |
| B1 | 47.62 | 47.62 | 47.62 | 47.62 | 47.62 | 47.62 | 47.62 | 47.62 | 47.62 |
| NCO:NH | 1.1 | 1.1 | 1.1 | 1.1 | 1.1 | 1.1 | 1.1 | 1.1 | 1.1 |
| BK drying time: | | | | | | | | | |
| Set to touch time/ phase 1 [h:min] | 02:45 | 01:30 | 01:15 | 01:00 | 00:45 | 00:30 | 01:45 | 02:00 | 01:30 |
| Through dry time/ phase 4 [h:min] | >12:00 | 08:00 | 04:00 | 02:30 | 02:15 | 01:30 | >12:00 | 10:30 | 10:00 |
| Tensile strength, initial [N/mm$^2$] | 10.8 | 11 | 14.2 | 16.1 | 31.9 | 36.7 | 13.1 | 13.7 | 16.6 |
| Elongation at break, initial | 250 | 190 | 175 | 135 | 56 | 18 | 200 | 155 | 105 |

TABLE 2

| | Ref. 8 | Ref. 9 | E3 | E4 | E5 | E6 | Ref. 10 | Ref. 11 | Ref. 12 | Ref. 13 |
|---|---|---|---|---|---|---|---|---|---|---|
| Component 1 | | | | | | | | | | |
| P1-1 | 33.37 | 30.37 | 27.37 | 24.37 | 21.37 | 18.37 | | | | |
| P2 | 14.27 | 17.27 | 20.27 | 23.27 | 26.27 | 29.27 | 14.27 | 17.27 | 20.27 | 23.27 |
| P1-2 | | | | | | | 33.37 | 30.37 | 27.37 | 24.37 |
| P1/P2 | 2.34 | 1.76 | 1.35 | 1.05 | 0.81 | 0.63 | 2.34 | 1.76 | 1.35 | 1.05 |
| P1-1/P1-2 | — | — | — | — | — | — | 0 | 0 | 0 | 0 |
| Component 2 | | | | | | | | | | |
| B2 | 52.38 | 52.38 | 52.38 | 52.38 | 52.38 | 52.38 | 52.38 | 52.38 | 52.38 | 52.38 |
| B1 | 47.62 | 47.62 | 47.62 | 47.62 | 47.62 | 47.62 | 47.62 | 47.62 | 47.62 | 47.62 |
| NCO:NH | 1.1 | 1.1 | 1.1 | 1.1 | 1.1 | 1.1 | 1.1 | 1.1 | 1.1 | 1.1 |
| BK drying time: | | | | | | | | | | |
| Set to touch time/ phase 1 [h:min] | 00:30 | 00:45 | 00:45 | 00:45 | 01:15 | 01:15 | 08:00 | 07:00 | 07:00 | 04:15 |
| Through dry time/ phase 4 [h:min] | 01:30 | 01:45 | 02:00 | 02:15 | 02:45 | 03:15 | >12:00 | >12:00 | >12:00 | >12:00 |
| Tensile strength, initial [N/mm$^2$] | 38 | 30 | 25 | 17.8 | 16.1 | 13.4 | 4.2 | 4.1 | n.d. | n.d. |
| Elongation at break, initial [%] | 11 | 28 | 75 | 100 | 140 | 125 | 265 | 260 | n.d. | n.d. |

n.d. = not determinable since too soft

TABLE 3

| | E7 | E8 | E9 | E10 | E11 | E12 |
|---|---|---|---|---|---|---|
| Component 1 | | | | | | |
| P1-1 | 12.58 | 17.58 | 17.58 | 21.7 | 21.7 | 21.7 |
| P2 | 21 | 21 | 21 | 26.7 | 26.7 | 26.7 |
| P1-2 | 14.82 | 9.82 | 9.82 | 0 | 0 | 0 |
| Defoamer | 0.6 | 0.6 | 0.6 | 0.6 | 0.6 | 0.6 |
| Dispersant | 0.2 | 0.2 | 0.2 | 0.2 | 0.2 | 0.2 |
| HALS | 0.5 | 0.5 | 0.5 | 0.5 | 0.5 | 0.5 |
| Antioxidant | 0.3 | 0.3 | 0.3 | 0.3 | 0.3 | 0.3 |

TABLE 3-continued

| | E7 | E8 | E9 | E10 | E11 | E12 |
|---|---|---|---|---|---|---|
| Molecular sieve | 1.1 | 1.1 | 1.1 | 1.1 | 1.1 | 1.1 |
| TiO2 | 23.4 | 23.4 | 23.4 | 23.4 | 23.4 | 23.4 |
| Baryte | 24.5 | 24.5 | 24.5 | 24.5 | 24.5 | 24.5 |
| Silica | 1 | 1 | 1 | 1 | 1 | 1 |
| Total | 100 | 100 | 100 | 100 | 100 | 100 |
| P1/P2 | 1.30 | 1.30 | 1.30 | 0.81 | 0.81 | 0.81 |
| P1-1/P1-2 | 0.85 | 1.79 | 1.79 | — | — | — |
| Component 2 | | | | | | |
| B2 | 52.38 | 60 | 75 | 52.38 | 60 | 75 |
| B1 | 47.62 | 40 | 25 | 47.62 | 40 | 25 |
| NCO:NH | 1.1 | 1.1 | 1.1 | 1.1 | 1.1 | 1.1 |
| BK drying time: | | | | | | |
| Set to touch time/phase 1 [h:min] | 01:30 | 01:15 | 01:15 | 01:00 | 01:00 | 01:00 |
| Through dry time/phase 4 [h:min] | 06:00 | 03:45 | 05:00 | 02:30 | 02:45 | 03:00 |
| Tensile strength, initial [N/mm$^2$] | 16.3 | 15.5 | 13.5 | 22.1 | 18.1 | 17.5 |
| Elongation at break, initial [%] | 150 | 120 | 195 | 80 | 110 | 170 |
| Tensile strength, water storage [N/mm$^2$] | 19.8 | 14.9 | 8.5 | 18.4 | 18.7 | 9.8 |
| Elongation at break, water storage [%] | 165 | 160 | 220 | 155 | 175 | 195 |
| Tensile strength, heat storage [N/mm$^2$] | 15 | 18 | 10.7 | 17.8 | 18.2 | 8.8 |
| Elongation at break, heat storage [%] | 150 | 160 | 220 | 165 | 160 | 200 |
| Bond strength [N] | 115 | 104 | 112 | 81 | 81 | 83 |

The invention claimed is:

1. A composition consisting of a first component comprising:

at least one polyaspartic ester P1-1

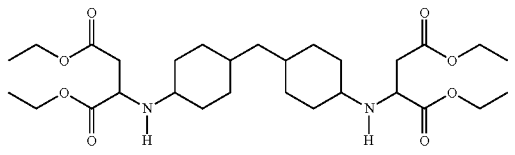 [SMILES: CCOC(=O)CC(NC1CCC(CC2CCC(NC(CC(=O)OCC)C(=O)OCC)CC2)CC1)C(=O)OCC]

of the formula (II);

optionally a polyaspartic ester P1-2

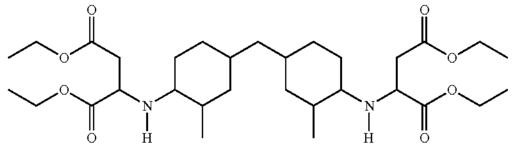 [SMILES: CCOC(=O)CC(NC1CCC(CC2CCC(NC(CC(=O)OCC)C(=O)OCC)C(C)C2)CC1C)C(=O)OCC]

of the formula (III);

a mixture of different polyether aspartic esters P2 having the following formula:

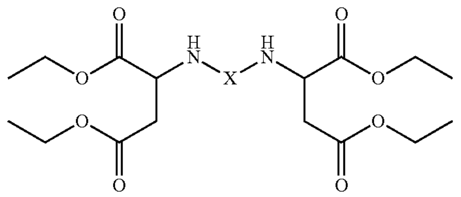

where X is the residue of a polyether polyamine having a repeat unit of the structure

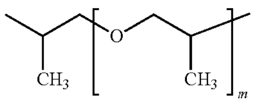

where m=2 to 35, and a second component comprising:

at least one aliphatic polyisocyanate B1;

at least one isocyanate prepolymer B2;

where:

the polyaspartic ester P1-1, the polyaspartic ester P1-2 and the mixture of different polyether aspartic esters P2 are present in such an amount that the weight ratio ((P1-1+P1-2)/P2) is ≤1.5, and the weight ratio P1-1/P1-2 is ≥0.65, and the weight ratio B1/B2 is in the range of 0.7-3.0.

2. The composition as claimed in claim 1, wherein the weight ratio B1/B2 is in the range of 0.8-2.5, 0.9-2.0.

3. The composition as claimed in claim 1, wherein the polyaspartic ester P1-1 and the polyaspartic ester P1-2 have an equivalent weight of 220-300.

4. The composition as claimed in claim 1, wherein the weight ratio P1-1/P1-2 is ≥0.75.

5. The composition as claimed in claim 1, wherein the weight ratio ((P1-1+P1-2)/P2) is ≤1.4.

6. The composition as claimed in claim 1, wherein the mixture of polyether polyamines is a mixture of polyether polyamines of the formula (IV)

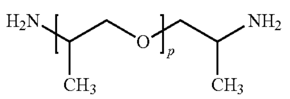

where p represents a number having a value of at least 2.

7. The composition as claimed in claim 1, wherein the polyaspartic esters P1-1, the optional polyaspartic esters P1-2 and the mixture of different polyether aspartic esters P2 collectively contain more than 95% by weight of the NCO-reactive groups, of the first component, based on the total weight of the first component.

8. The composition as claimed in claim 1, wherein the aliphatic polyisocyanate B1 is an oligomer, polymer or derivative derived from HDI or IPDI.

9. The composition as claimed in claim 1, wherein the isocyanate prepolymer B2 has an isocyanate group (NCO) functionality of 1.9 to 2.5.

10. The composition as claimed in claim 1, wherein the isocyanate prepolymer B2 is a reaction product of an aliphatic isocyanate monomer and/or an aliphatic isocyanate oligomer with a polyol.

11. The composition as claimed in claim 1, wherein the composition immediately after the two components have been mixed, has a viscosity of 4,000 to 10,000 mPas, measured for 30 seconds at 5 rpm with a No. 5 spindle, determined with a Brookfield viscometer at 23° C.

12. The composition as claimed in claim 1, wherein the composition includes less than 5% by weight of organic solvents, based on the total weight of the composition.

13. The composition as claimed in claim 1, wherein the ratio of isocyanate groups relative to the groups reactive with isocyanate groups, is in the range from 0.95 to 1.5.

14. A coating formed using the composition as claimed in claim 1.

15. A coating system comprising at least one layer as claimed in claim 14.

16. A method comprising the step of applying a composition as claimed in claim 1 as coating to a substrate.

* * * * *